United States Patent
Coffey et al.

(10) Patent No.: US 10,911,079 B2
(45) Date of Patent: Feb. 2, 2021

(54) TRANSMITTER, COMMUNICATION SYSTEM AND TRANSMISSION METHOD

(71) Applicant: Realtek Semiconductor Corp., HsinChu (TW)

(72) Inventors: John Timothy Coffey, San Francisco, CA (US); Der-Zheng Liu, Hsinchu County (TW); Hsuan-Yen Chung, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/794,247

(22) Filed: Feb. 19, 2020

(65) Prior Publication Data
US 2020/0403648 A1 Dec. 24, 2020

Related U.S. Application Data

(60) Provisional application No. 62/863,276, filed on Jun. 19, 2019.

(51) Int. Cl.
*H04B 1/04* (2006.01)
*H04L 27/26* (2006.01)

(52) U.S. Cl.
CPC ........... *H04B 1/04* (2013.01); *H04L 27/2628* (2013.01)

(58) Field of Classification Search
CPC ......... H04B 1/02; H04B 1/04; H04L 27/2628; H04L 1/004; H04L 1/0041; H04L 1/0043; H04L 1/0056; H04L 1/0057; H04L 1/0076; H04L 1/0078; H04L 1/0083; H04L 1/009
See application file for complete search history.

(56) References Cited

U.S. PATENT DOCUMENTS

| | | | |
|---|---|---|---|
| 5,844,922 A * | 12/1998 | Wolf | H03M 13/256 714/786 |
| 2007/0270102 A1 | 11/2007 | Zhu | |
| 2011/0122846 A1* | 5/2011 | Yu | H04L 1/0057 370/335 |
| 2014/0254709 A1* | 9/2014 | Flowers | H04L 1/0045 375/285 |
| 2017/0367118 A1 | 12/2017 | Choi | |
| 2018/0324604 A1 | 11/2018 | Yang | |
| 2019/0342796 A1* | 11/2019 | Lepp | H04L 1/0003 |

* cited by examiner

*Primary Examiner* — Siu M Lee
(74) *Attorney, Agent, or Firm* — Winston Hsu

(57) ABSTRACT

A transmitter operating in a communication system is provided. The transmitter includes an encoding circuit and a modulation circuit. The transmitter is configured to generate multiple encoded bits according to an encoding relationship, in which the encoding relationship is corresponding to a code rate and a minimum distance, and the minimum distance is greater than a reciprocal of the code rate. The modulation circuit is configured to generate a transmission signal according to the encoded bits, such that the encoded bits are transmitted over multiple subcarriers, and each encoded bit is transmitted via a subcarrier. The encoding relationship is corresponding to multiple output codewords, and the minimum distance represents a minimum Hamming distance between two distinct output codewords. One of the output codewords includes the encoded bits.

12 Claims, 3 Drawing Sheets

TRANSMITTER, COMMUNICATION SYSTEM AND TRANSMISSION METHOD

CROSS REFERENCE TO RELATED APPLICATIONS

This application claims the benefit of U.S. provisional application No. 62/863,276, filed on Jun. 19, 2019, which is incorporated herein by reference.

BACKGROUND OF THE INVENTION

1. Field of the Invention

The present application relates to a transmitter, communication system and transmission method, and more particularly, to a transmitter, communication system and transmission method capable of providing high robustness in a range extension mode.

2. Description of the Prior Art

The IEEE 802.11bd amendment, currently under development, addresses Next Generation Vehicle-to-Everything (V2X) communications. The amendment defines modifications to both the IEEE 802.11 Medium Access Control layer (MAC) and Physical Layers (PHY) for V2X communications for the 5.9 GHz band and, optionally, in the 60 GHz frequency band (57 GHz to 71 GHz) as defined in each case by IEEE Std 802.11™-2016.

As one of several design goals, the eventual amendment will provide for extended range compared to IEEE Std 802.11™-2016: the amendment will define at least one mode that achieves at least 3 dB lower sensitivity level (longer range), than that of the lowest data rate defined in IEEE Std 802.11™-2016 operating in the 5.9 GHz band (3 Mb/s in a 10 MHz channel).

Therefore, how to provide a transmission scheme for the range extension mode is a significant objective in the field.

SUMMARY OF THE INVENTION

It is therefore a primary objective of the present application to provide a transmitter, communication system and transmission method capable of providing high robustness in a range extension mode, to improve over disadvantages of the prior art.

An embodiment of the present application provides a transmitter operating in a communication system. The transmitter includes an encoding circuit and a modulation circuit. The encoding circuit is configured to generate multiple encoded bits according to an encoding relationship, in which the encoding relationship is corresponding to a code rate and a minimum distance, and the minimum distance is greater than a reciprocal of the code rate. The modulation circuit is configured to generate a transmission signal according to the encoded bits, such that the encoded bits are transmitted over multiple subcarriers, and each encoded bit is transmitted via one of the subcarriers. The encoding relationship is corresponding to multiple output codewords, and the minimum distance represents a minimum Hamming distance between two distinct output codewords. One of the output codewords includes the encoded bits.

An embodiment of the present application provides a communication system. The communication system includes a transmitter comprising an encoding circuit and a modulation circuit, and a receiver. The encoding circuit is configured to generate multiple encoded bits according to an encoding relationship, in which the encoding relationship is corresponding to a code rate and a minimum distance, and the minimum distance is greater than a reciprocal of the code rate. The modulation circuit is configured to generate a transmission signal according to the encoded bits, such that the encoded bits are transmitted over multiple subcarriers, and each encoded bit is transmitted via one of the subcarriers. The encoding relationship is corresponding to multiple output codewords, and the minimum distance represents a minimum Hamming distance between two distinct output codewords. One of the output codeword comprises the plurality of encoded bits. The receiver is configured to decode the plurality of encoded bits according to the encoding relationship.

An embodiment of the present application provides a transmission method. The transmission method includes the following steps: generating multiple encoded bits according to an encoding relationship, in which the encoding relationship is corresponding to a code rate and a minimum distance, and the minimum distance is greater than a reciprocal of the code rate; and generating a transmission signal according to the encoded bits, such that the encoded bits are transmitted over multiple subcarriers, and each encoded bit is transmitted via one of the subcarriers. The encoding relationship is corresponding to multiple output codewords, and the minimum distance represents a minimum Hamming distance between two distinct output codewords. One of the output codewords includes the encoded bits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
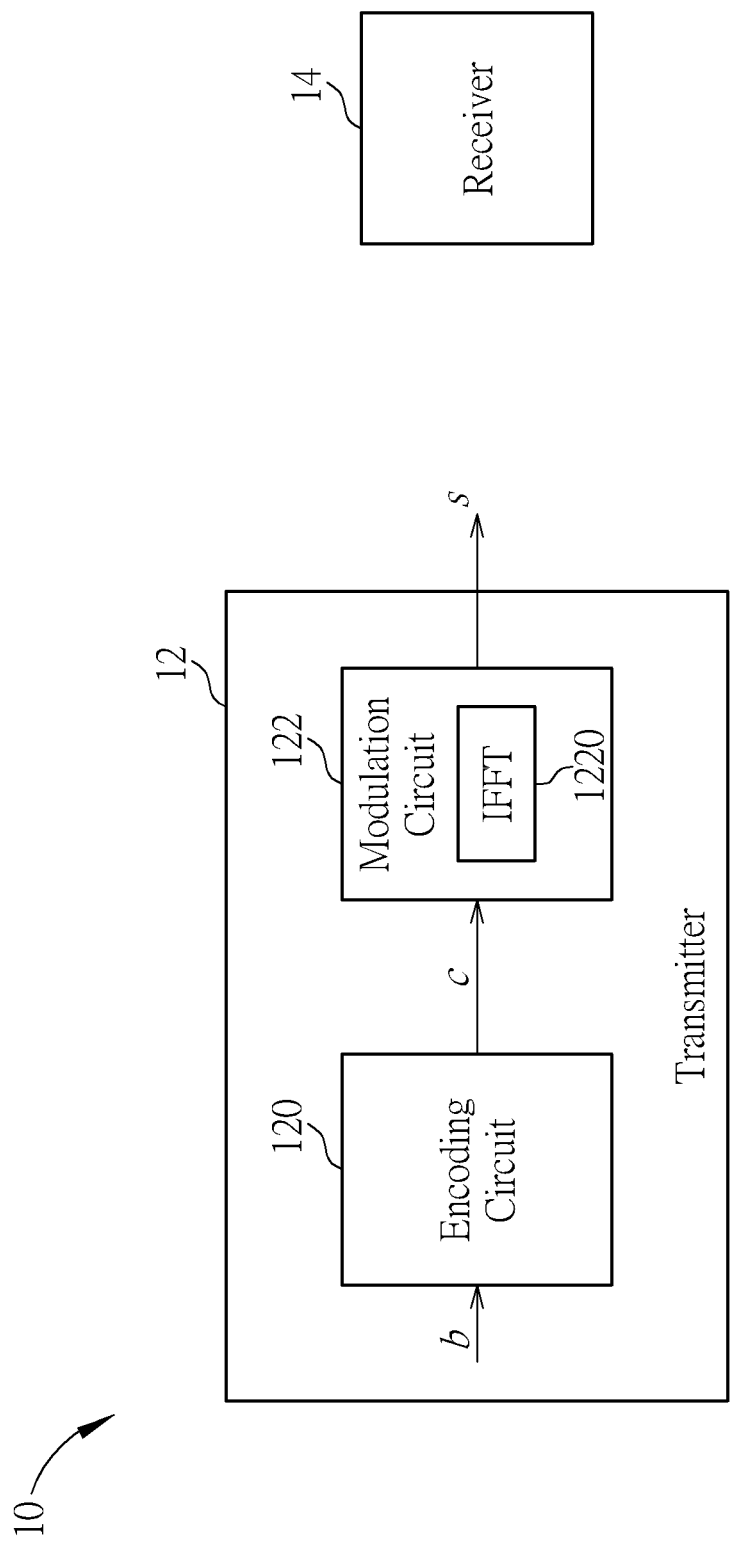
FIG. 1 is a schematic diagram of a communication system according to an embodiment of the present application.

FIG. 1 is a schematic diagram of a communication system 10 according to an embodiment of the present application. The communication system 10 may be a Next Generation Vehicle-to-Everything (V2X) communication system, and may comply with a standard specified in IEEE Std 802.11™-2016 or IEEE 802.11bd, which is not limited thereto. The communication system 10 comprises a transmitter 12 and a receiver 14. The transmitter 12 comprises an encoding circuit 120 and a modulation circuit 122. The encoding circuit 120 and the modulation circuit 122 may be realized by, e.g., ASIC (Application-Specific Integrated Circuit), DSP (Digital Signal Processor), but not limited therein. In an embodiment, the transmitter 12 may be disposed within a vehicle, and the receiver 14 may be a wireless station or an access point disposed by a road.

The encoding circuit 120 receives a plurality of input bits b, and generates a plurality of encoded bits c corresponding to the plurality of input bits b according to an encoding relationship. In an embodiment, the encoding relationship may be formed as an encoding table, and the encoding circuit 120 may comprise a storage unit to store the encoding table, where the storage unit may be realized by non-volatile memory (e.g., ROM (read-only memory) or flash), volatile memory (e.g., RAM (random access memory)) or the likes.

The modulation circuit 122, coupled to the encoding circuit 120 to receive the plurality of encoded bits c, is configured to generate a transmission signal s according to the plurality of encoded bits c. The transmission signal s may be applied in a range extension mode specified in IEEE 802.11, in which error rate performance is more valuable than data rate. The transmission signal s may be an OFDM (Orthogonal Frequency-Division Multiplexing) symbol over $N_{FFT}$ subcarriers, where $N_{FFT}$ denotes a number of total subcarriers. In an embodiment, the modulation circuit 122 may comprise an IFFT (inverse Fast Fourier transform) module 1220.

For example, $N_{FFT}$ may be 64 for an IEEE 802.11 system. The plurality of encoded bits c are transmitted via a part of subcarriers, e.g., n subcarriers (n<$N_{FFT}$), among the overall $N_{FFT}$ subcarriers, and each encoded bit c is transmitted via one subcarrier.

Figure 2:
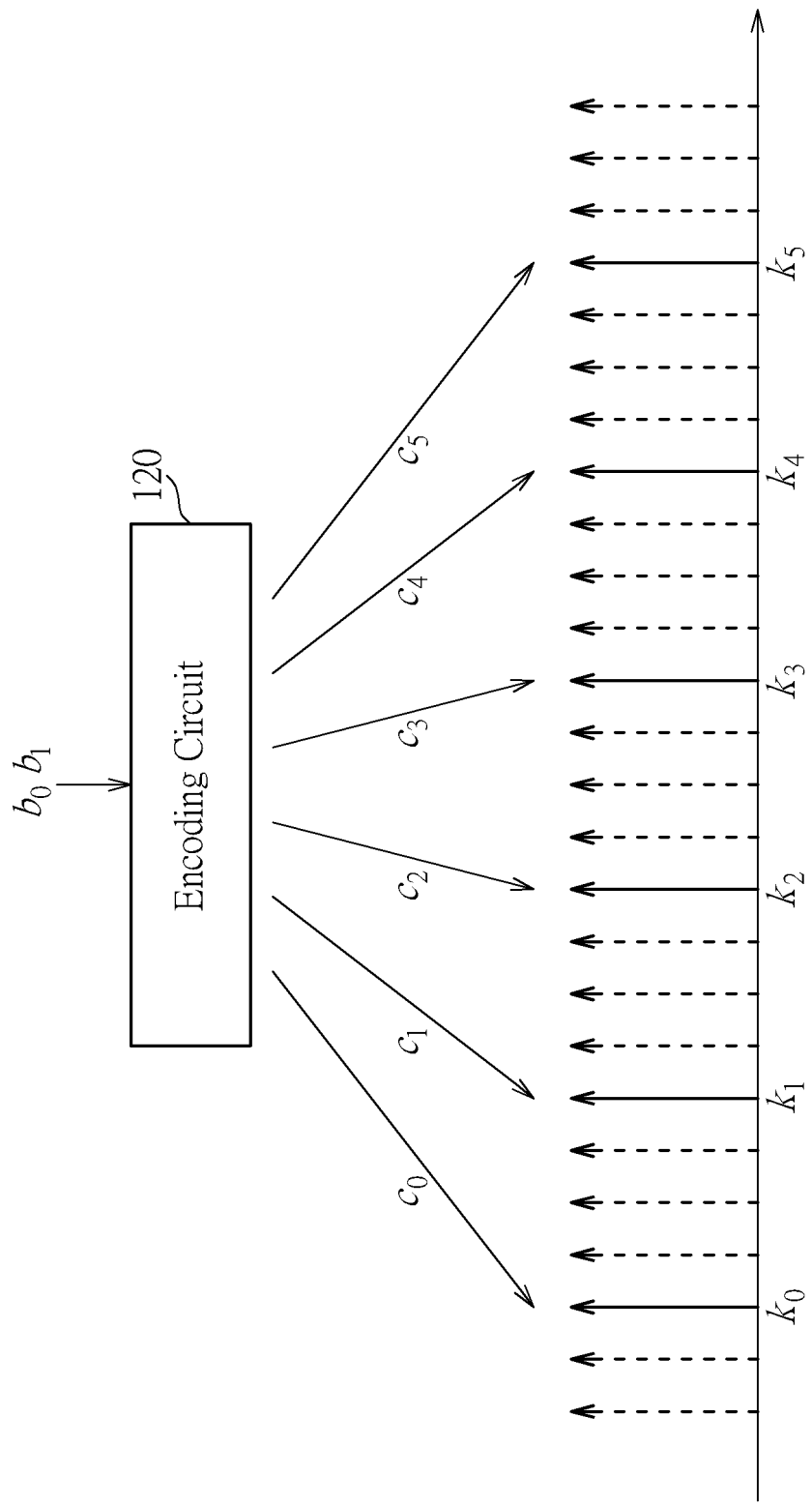
FIG. 2 is a schematic diagram of a plurality of encoded bits transmitted over a plurality of subcarriers according to an embodiment of the present application.

For example, FIG. 2 illustrates a plurality of encoded bits transmitted over a plurality of subcarriers according to an embodiment of the present application. In the embodiment illustrated in FIG. 2, the encoding circuit 120 receives two input information bits $b_0$, $b_1$ and encodes the input bits $b_0$, $b_1$ as/into encoded bits $c_0, \ldots, c_5$. The encoded bits $c_0, \ldots, c_5$ may be modulated by the modulation circuit 122, e.g., by using BPSK (Binary Phase Shift Keying) modulation, and designated to subcarriers $k_0, \ldots, k_5$. Through the transmission signal s, the encoded bits $c_0, \ldots, c_5$ are transmitted via the subcarriers $k_0, \ldots, k_5$ by the transmitter 12. Note that, each encoded bit may be transmitted via one single subcarrier. For example, the encoded bit $c_j$ is transmitted via the subcarrier $k_j$.

The encoding relationship may be, in the terminology/language of error-correction code theory, viewed as a (n, k, d) block code, where n represents an output codeword length or equivalently a number of the plurality of encoded bits, k represents a number of input information bits, and d represents the minimum Hamming distance between two distinct output codewords. The encoding relationship as the (n, k, d) code is to map k input information bits to an output codeword cw with length n, where the output codeword cw may comprise the plurality of encoded bits c. The minimum Hamming distance d is a minimum number of positions/bits in which any two distinct codewords differ. The encoding relationship of the (n, k, d) code has a code rate k/n.

Preferably, the (n, k, d) code is chosen such that the minimum distance d is greater than a reciprocal of the code rate k/n, i.e., d>n/k. For example, in the embodiment illustrated in FIG. 2, in which k=2 and n=6, a (6, 2, 4) code may be adopted (4>6/2=3). A (6, 2, 4) code may be presented as Table I as follows.

TABLE I

| $b_0b_1$ | cw = $(c_0, \ldots, c_5)$ |
|---|---|
| 00 | $cw_0$ = 000000 |
| 01 | $cw_1$ = 001111 |
| 10 | $cw_2$ = 110011 |
| 11 | $cw_3$ = 111100 |

As can be seen from above, the (6, 2, 4) code in Table I comprises 4 distinct output codewords $cw_0$-$cw_3$, and the minimum distance d between two distinct output codewords $cw_i$ and $cw_j$ is 4. If the encoding circuit 120 receives input information bits as $b_0b_1$=01, the encoding circuit 120 would output the output codeword $cw_1$=$(c_0, \ldots, c_5)$=001111 to the modulation circuit 122, such that the encoded bits $c_0$=0, $c_1$=0, $c_2$=1, $c_3$=1, $c_4$=1, $c_5$=1, embedded within the transmission signal s, would be transmitted via the subcarriers $k_0, \ldots, k_5$.

Note that, Table I only illustrates one kind of (6, 2, 4) code. There are a variety of (6, 2, 4) codes equivalent to the one shown in Table I, which can be used as the encoding relationship adopted by the encoding circuit 120. For example, Table II illustrates another (6, 2, 4) code. In the language of forward error correction coding theory, the two (n, k, d) codes in Table I and Table II are 'equivalent'. All such equivalent (6, 2, 4) codes, used as an inner code as part of an IEEE Std 802.11™-2016 system, are claimed as part of the present application.

TABLE II

| $b_0b_1$ | cw = $(c_0, \ldots, c_5)$ |
|---|---|
| 00 | $cw_0$ = 000000 |
| 01 | $cw_1$ = 010111 |
| 10 | $cw_2$ = 101011 |
| 11 | $cw_3$ = 111100 |

In addition, flipping any fixed subset of bits from 0 to 1 and vice versa across all codewords will maintain the distance properties across all pairs of codewords and will not change the fundamental principles involved. For example, flipping/relabeling the first bit $b_0$ from 0 to 1 and from 1 to 0 in the (6, 2, 4) code shown in Table I would produce another (6, 2, 4) code shown in Table III. In the language of forward error correction theory, this is a 'translate' or 'cosec' of the original code. Again, as will be clear to those skilled in the art, this does not change the fundamental principles or properties of the invention, and all such translates of a (6, 2, 4) code, used as an inner code as part of an IEEE Std 802.11™-2016 system, are claimed as part of the present application.

TABLE III

| $b_0b_1$ | cw = $(c_0, \ldots, c_5)$ |
|---|---|
| 00 | $cw_0$ = 100000 |
| 01 | $cw_1$ = 101111 |
| 10 | $cw_2$ = 010011 |
| 11 | $cw_3$ = 011100 |

In addition, the mapping of logical input information bits to output codewords has no special significance. For example, the mapping of logical input information bits to output codewords shown in Table. IV complies with the same principles as Table I. All such equivalent mappings of logical input bits to codewords in any (6, 2, 4) code or translate thereof, used as an inner code as part of an IEEE Std 802.11™-2016 system, are claimed as part of the present application.

TABLE IV

| $b_0b_1$ | cw = $(c_0, \ldots, c_5)$ |
|---|---|
| 11 | $cw_0$ = 000000 |
| 10 | $cw_1$ = 001111 |
| 01 | $cw_2$ = 110011 |
| 00 | $cw_3$ = 111100 |

In addition to adopting the (6, 2, 4) code, a (8, 2, 5) code, e.g., codes shown in Table V, may also be used (note that, 5>8/2=4). Similarly, all equivalent (8, 2, 5) codes are all within the scope of the present application.

TABLE V

| $b_0 b_1$ | cw = $(c_0, \ldots, c_5)$ |
|---|---|
| 11 | $cw_0$ = 00000000 |
| 10 | $cw_1$ = 00011111 |
| 01 | $cw_2$ = 11111000 |
| 00 | $cw_3$ = 11100111 |

It should be noted that, in IEEE 802.11 bd system, DCM (dual carrier modulation) transmission signal transmitted/applied for the range extension mode is used. In DCM, pairs of tones/subcarriers are grouped, and the same data (or information bit) is transmitted over each pair of tones/subcarriers simultaneously. In the language of forward error correction theory, DCM can be viewed/described as a (2, 1, 2) repetition code. For the (2, 1, 2) repetition code, a robustness gain (which may be contributed simply by diversity gain) of $10 \log_{10} d = 10 \log_{10} 2 = 3$ dB would be obtained. The (2, 1, 2) repetition code can be easily extended as a (3, 1, 3) repetition code, to obtain more diversity gain. For the (3, 1, 3) repetition code, a robustness gain (which may be contributed simply by diversity gain) of $10 \log_{10} d = 10 \log_{10} 3 = 4.7$ dB would be obtained.

Note that, all repetition codes are a kind of (n, 1, d) code with d=n. In other words, the minimum distance d of the repetition codes is equal to the output codeword length n, the reciprocal of the code rate, i.e., d=1/(1/n)=n. As can be seen, the longer minimum distance d would lower the code rate 1/n, which means, obtaining higher robustness/diversity gain usually sacrifices the code rate.

Different from the repetition codes, the encoding relationship of the (n, k, d) code with d>n/k is used within the encoding circuit 120. Take the (6, 2, 4) codes shown in Tables I-IV as examples, a robustness gain of $10 \log_{10} d = 10 \log_{10} 4 = 6$ dB would be obtained, while the code rate is sustained as ⅓, the same as the (3, 1, 3) repetition code. Similarly, the (8, 2, 5) code would obtain a higher robustness gain of $10 \log_{10} d = 10 \log_{10} 5 = 7$ dB and keep the same ¼ code rate, compared to the ones of the (4, 1, 4) repetition code. The extra robustness gain of the (n, k, d) code with d>n/k is contributed by the coding gain, where the (n, k, d) code with d>n/k may be obtained by exhaustive searching over $2^n$ potential codewords to select k codewords which satisfies the minimum distance d with d>n/k.

Therefore, using the (n, k, d) code with d>n/k would achieve higher robustness gain without sacrificing the code rate. Transmitting the encoded bits via the part of subcarriers would be suitable for the range extension mode.

Figure 3:
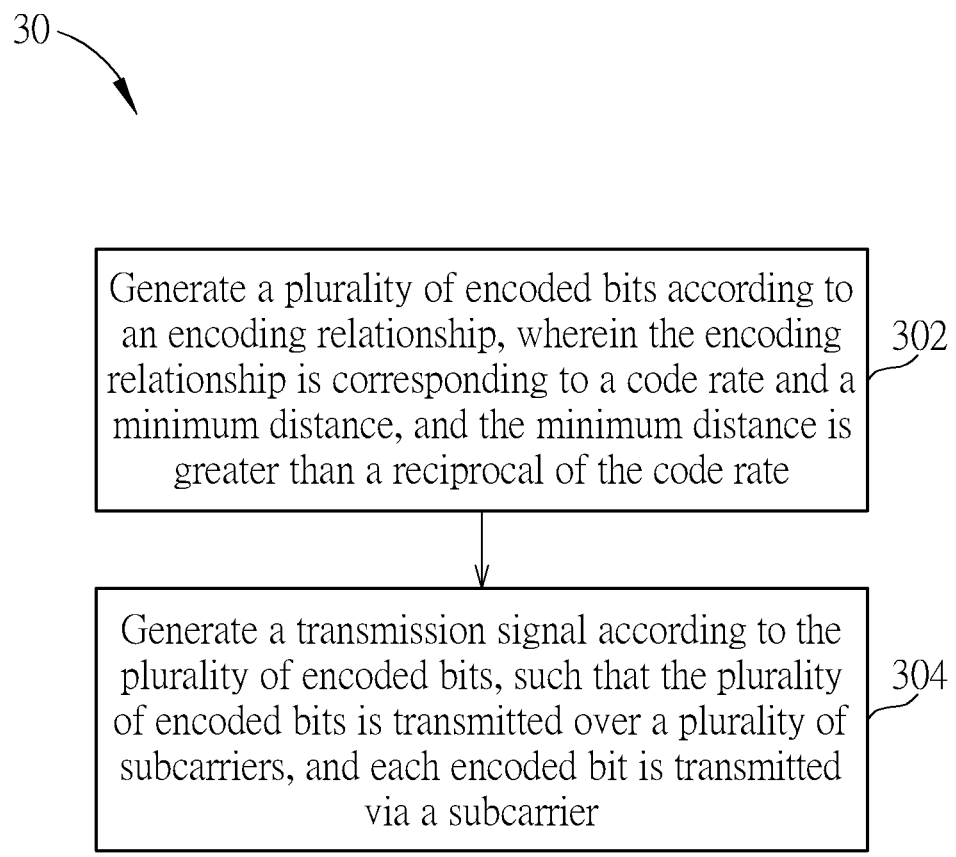
FIG. 3 is a schematic diagram of a transmission method according to an embodiment of the present application.

FIG. 3 is a schematic diagram of a transmission method 30 according to an embodiment of the present application. Details of the transmission method 30 can be referred by the paragraphs stated in the above, which is no longer narrative for brevity.

At the receiving end, the receiver 14 is configured to perform a decoding operation the plurality of encoded bits c according to the encoding relationship. In an embodiment, the Bahl-Cocke-Jelinek-Raviv (BCJR) algorithm, known by the art, can be used to perform the decoding operation.

In summary, the present application utilizes the (n, k, d) code with d>n/k and transmits the output codeword or the encoded bits of the (n, k, d) code via n subcarriers, so as to achieve higher robustness gain and keep the same code rate as the repetition code. The present application is suitable for the range extension mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter, operating in a communication system, the transmitter comprising:
    an encoding circuit, configured to generate a plurality of encoded bits according to an encoding relationship, wherein the encoding relationship is corresponding to a code rate and a minimum distance, and the minimum distance is greater than a reciprocal of the code rate; and
    a modulation circuit, configured to generate a transmission signal according to the plurality of encoded bits, such that the plurality of encoded bits are transmitted over a plurality of sub carriers, and each encoded bit is transmitted via one of the subcarriers;
    wherein all coding schemes of the encoding circuit comply with the encoding relationship, the encoding relationship is corresponding to a plurality of output codewords, and the minimum distance represents a minimum Hamming distance between two distinct output codewords;
    wherein one of the output codeword comprises the plurality of encoded bits.

2. The transmitter of claim 1, wherein the transmission signal is applied in a range extension mode.

3. The transmitter of claim 1, wherein the modulation circuit comprises an inverse Fast Fourier transform (IFFT) module.

4. The transmitter of claim 1, wherein the encoding relationship is corresponding to a (n, k, d) code, where n represents an output codeword length, k represents a number of input information bit, d represents the minimum distance, the code rate is k divided by n, and (n, k, d) is equal to (6, 2, 4).

5. The transmitter of claim 1, wherein the encoding relationship is corresponding to a (n, k, d) code, where n represents an output codeword length, k represents a number of input information bit, d represents the minimum distance, the code rate is k divided by n, and (n, k, d) is equal to (8, 2, 5).

6. A communication system, comprising:
    a transmitter, comprising:
        an encoding circuit, configured to generate a plurality of encoded bits according to an encoding relationship, wherein the encoding relationship is corresponding to a code rate and a minimum distance, and the minimum distance is greater than a reciprocal of the code rate; and
        an modulation circuit, configured to generate a transmission signal according to the plurality of encoded bits, such that the plurality of encoded bits are transmitted over a plurality of subcarriers, and each encoded bit is transmitted via one of the subcarriers;
        wherein the encoding relationship is corresponding to a plurality of output codewords, and the minimum distance represents a minimum Hamming distance between two distinct output codewords;
        wherein one of the output codewords comprises the plurality of encoded bits; and a receiver, configured to decode the plurality of encoded bits according to the encoding relationship;

wherein the transmission signal is applied in a range extension mode.

7. The communication system of claim 6, wherein the communication system complies with a standard of IEEE 802.11bd.

8. The communication system of claim 6, wherein the encoding relationship is corresponding to a (n, k, d) code, where n represents an output codeword length, k represents a number of input information bit, d represents the minimum distance, the code rate is k divided by n, and (n, k, d) is equal to (6, 2, 4).

9. The communication system of claim 6, wherein the encoding relationship is corresponding to a (n, k, d) code, where n represents an output codeword length, k represents a number of input information bit, d represents the minimum distance, the code rate is k divided by n, and (n, k, d) is equal to (8, 2, 5).

10. A transmission method, comprising:

generating a plurality of encoded bits according to an encoding relationship, wherein the encoding relationship is corresponding to a code rate and a minimum distance, and the minimum distance is greater than a reciprocal of the code rate; and generating a transmission signal according to the plurality of encoded bits, such that the plurality of encoded bits are transmitted over a plurality of subcarriers, and each encoded bit is transmitted via one of the subcarriers;

wherein all coding schemes of generating the plurality of encoded bits comply with the encoding relationship, the encoding relationship is corresponding to a plurality of output codewords, and the minimum distance represents a minimum Hamming distance between two distinct output codewords;

wherein one of the output codewords comprises the plurality of encoded bits.

11. The transmission method of claim 10, wherein the encoding relationship is corresponding to a (n, k, d) code, where n represents an output codeword length, k represents a number of input information bit, d represents the minimum distance, the code rate is k divided by n, and (n, k, d) is equal to (6, 2, 4).

12. The transmission method of claim 10, wherein the encoding relationship is corresponding to a (n, k, d) code, where n represents an output codeword length, k represents a number of input information bit, d represents the minimum distance, the code rate is k divided by n, and (n, k, d) is equal to (8, 2, 5).

* * * * *